Jan. 30, 1934.   H. E. PRESTON   1,944,948
STOKER TUYÈRE
Filed Aug. 4, 1928   7 Sheets-Sheet 1

Inventor
Herbert E. Preston
by his Attorneys,
Howson & Howson

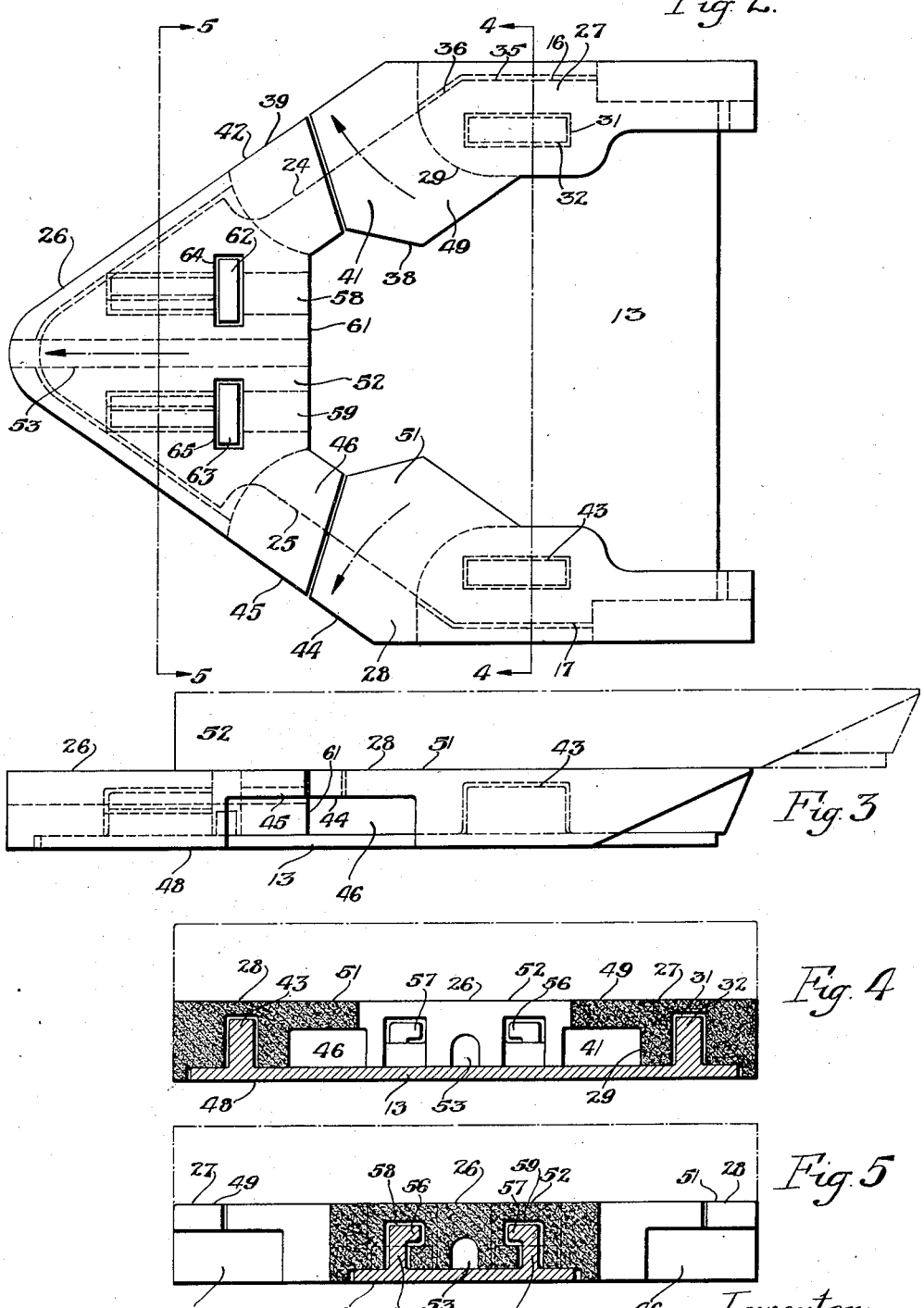

Jan. 30, 1934.  H. E. PRESTON  1,944,948
STOKER TUYÈRE
Filed Aug. 4, 1928    7 Sheets-Sheet 3
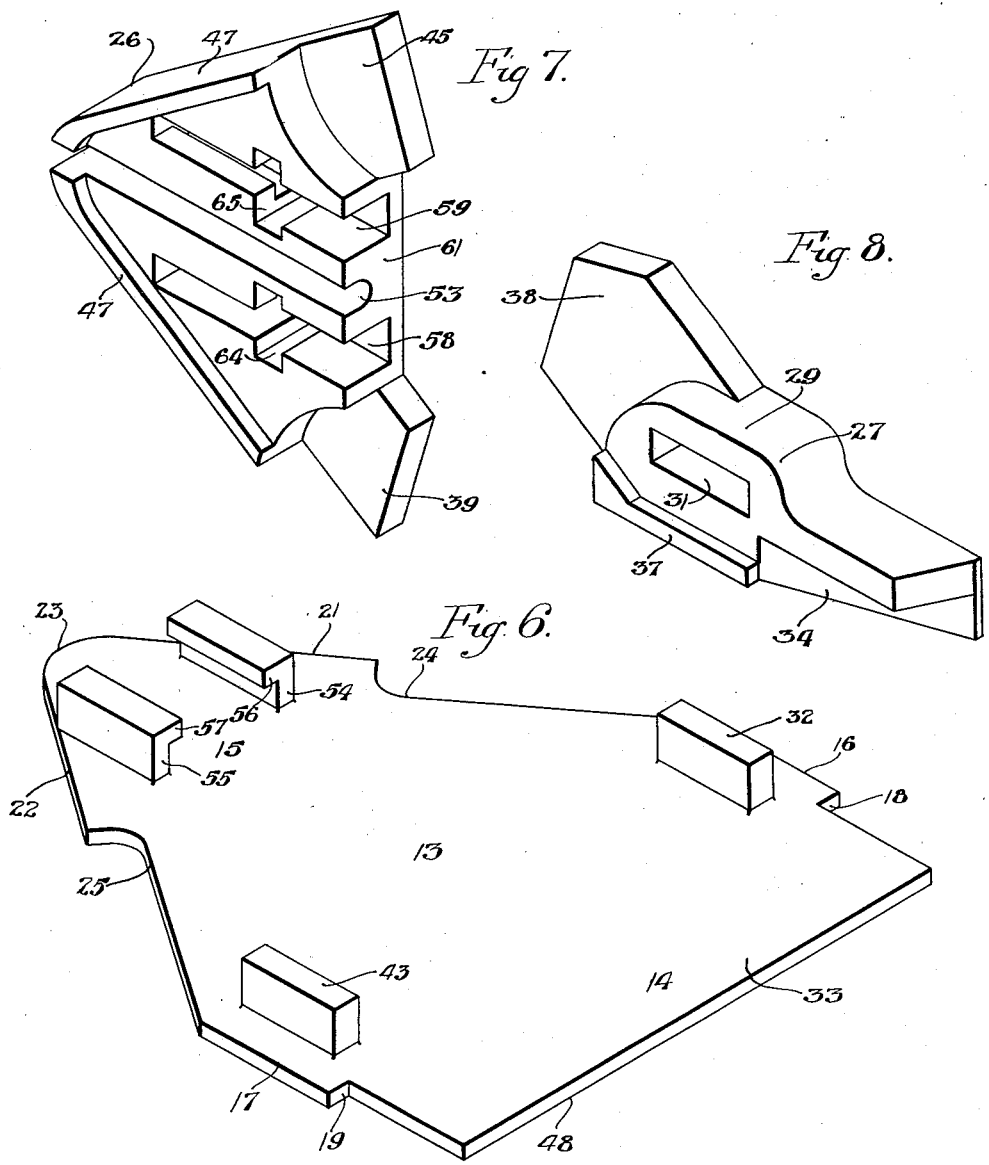
Inventor-
Herbert E. Preston-
by his Attorneys,
Howson & Howson

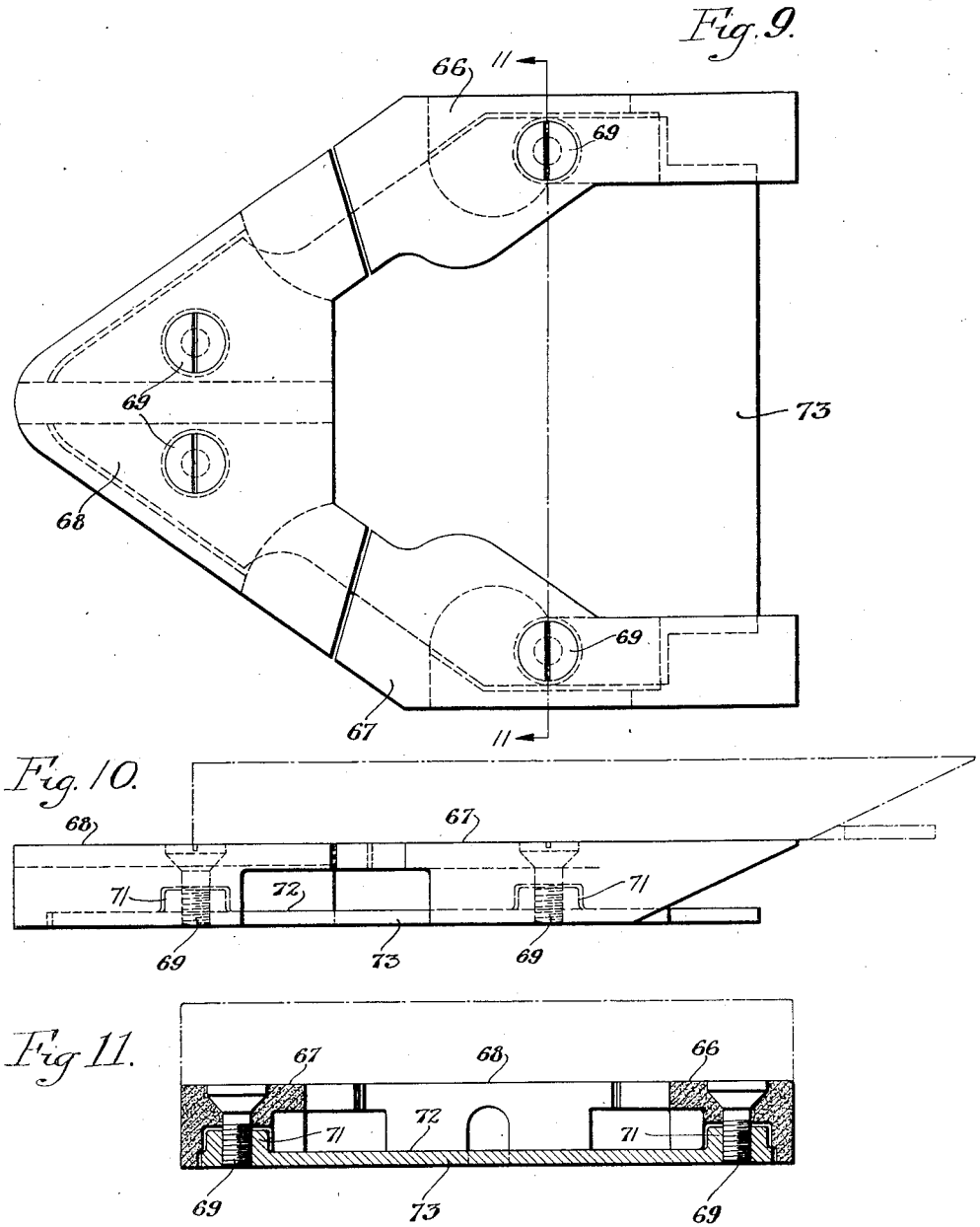

Jan. 30, 1934.     H. E. PRESTON     1,944,948
STOKER TUYÈRE
Filed Aug. 4, 1928     7 Sheets-Sheet 5
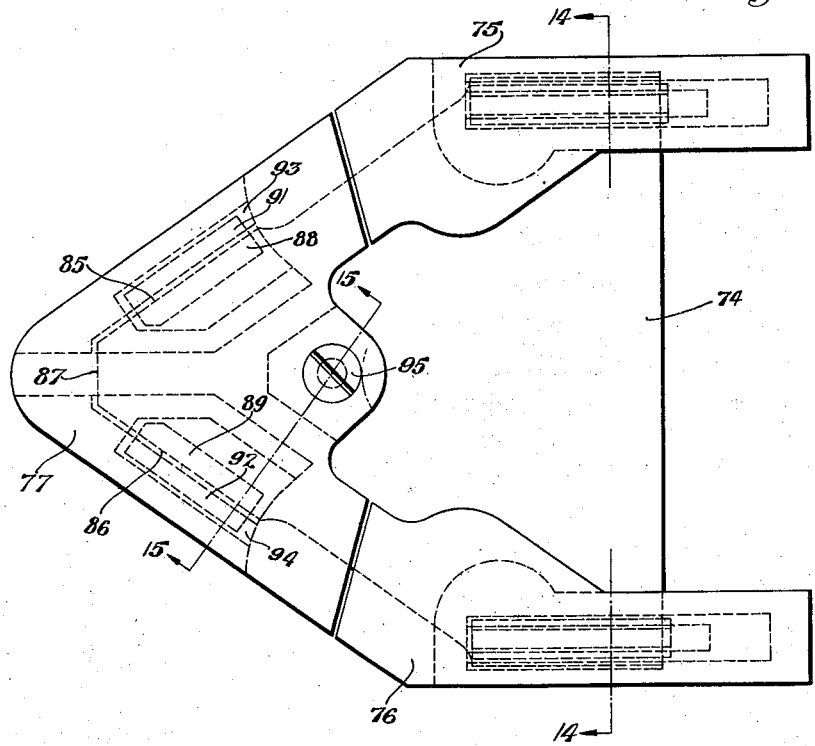
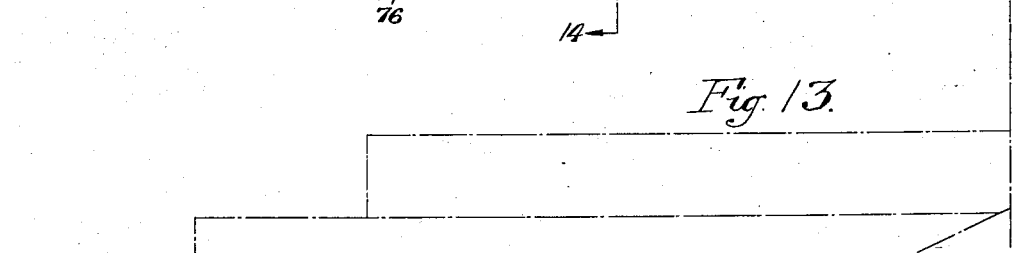
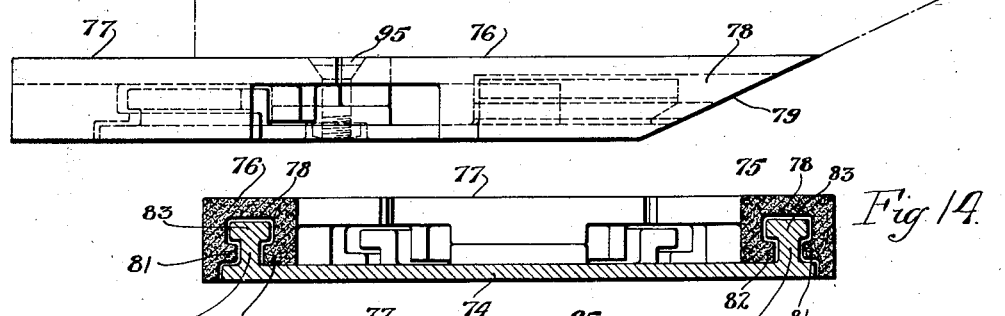
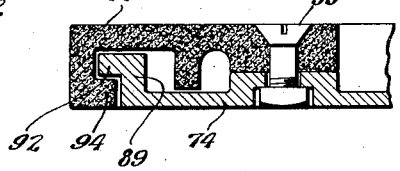

Jan. 30, 1934.  H. E. PRESTON  1,944,948
STOKER TUYÈRE
Filed Aug. 4, 1928  7 Sheets-Sheet 6
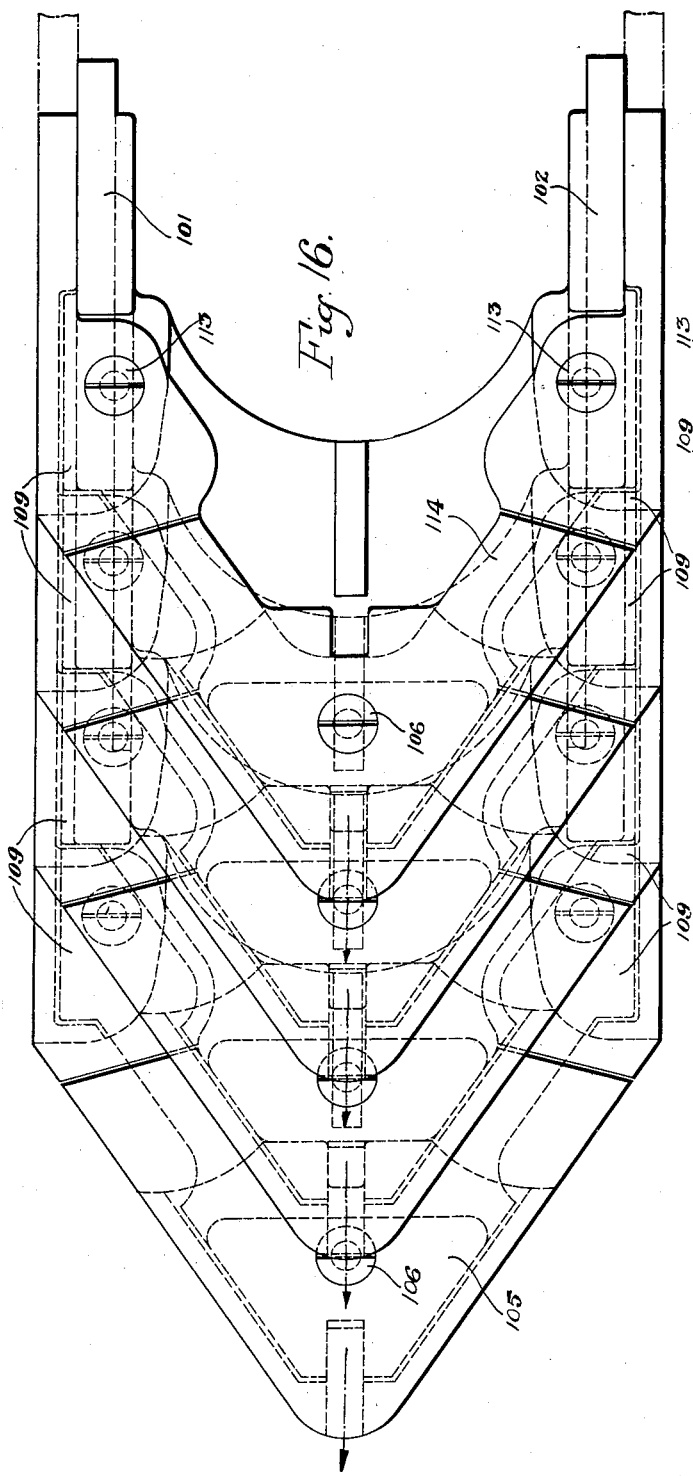
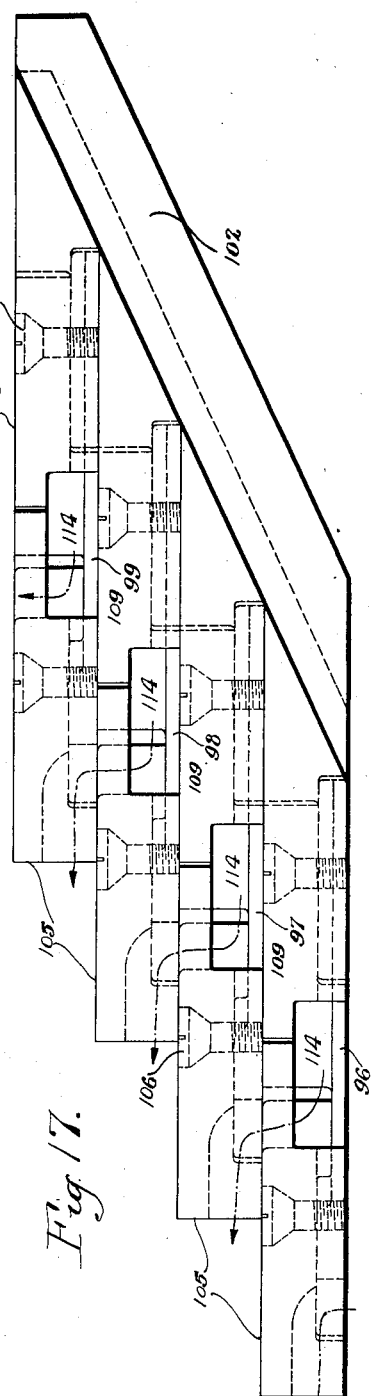
Inventor:-
Herbert E. Preston
by his Attorneys,
Howson & Howson

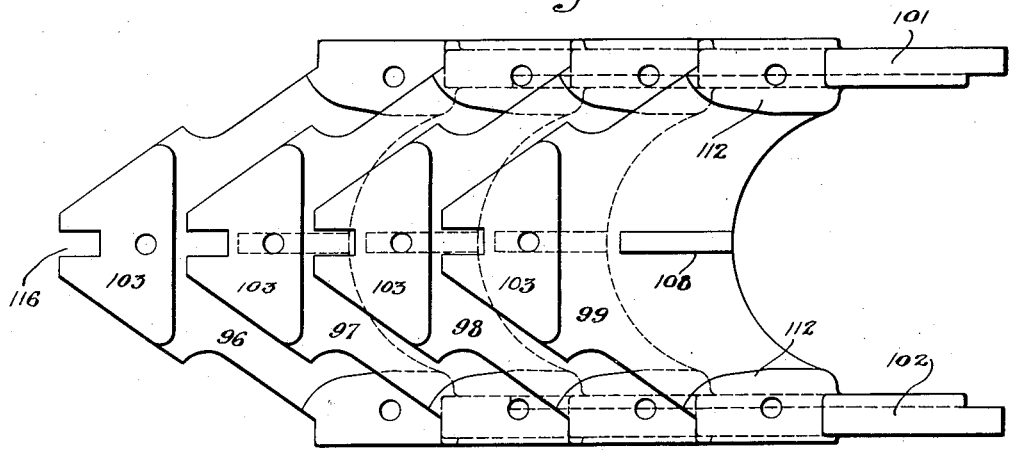
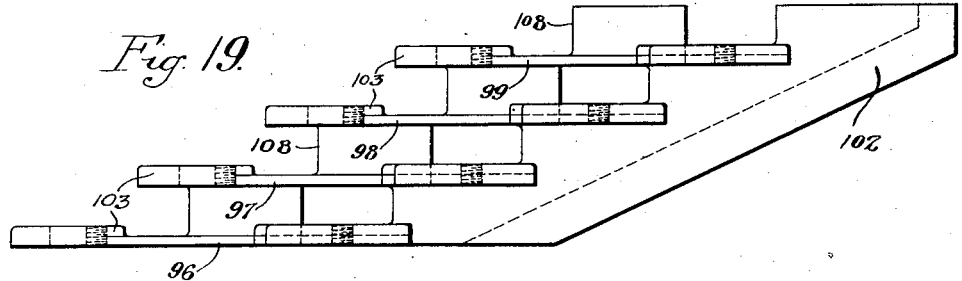
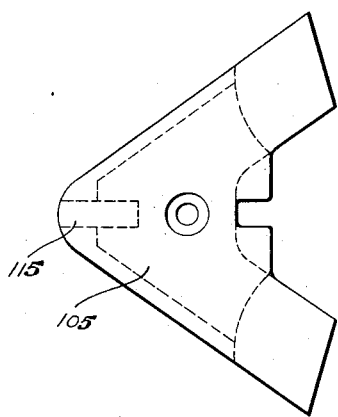
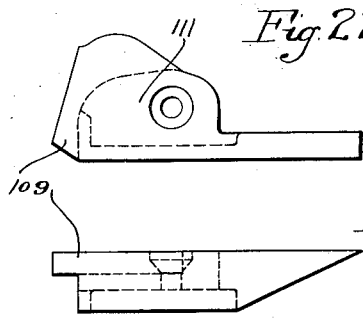
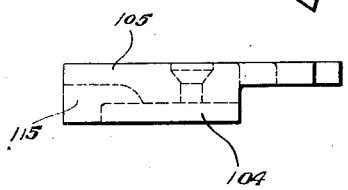

Patented Jan. 30, 1934

1,944,948

UNITED STATES PATENT OFFICE 1,944,948

STOKER TUYÈRE

Herbert E. Preston, Philadelphia, Pa., assignor to American Engineering Company, Philadelphia, Pa., a corporation of Pennsylvania Application August 4, 1928. Serial No. 297,495

18 Claims. (Cl. 110—44)

My invention relates to tuyères applicable, for example, to the furnaces of central-station power plants, and it has for one object the provision of a tuyère which shall be characterized by the fact that it withstands extremely high temperatures, while retaining its mechanical and structural strength; and by the fact that substantially no wear occurs due to the abrasive action of the heated fuel.

Another object of my invention is to provide a tuyère, wherein the portion subject to contact with the heated fuel may be readily removed with substantially no disturbance to the remaining portions of the tuyère,—my invention contemplating a tuyère wherein a plurality of protective blocks are removably mounted on a supporting base plate.

A further object of my invention is to provide a tuyère of the character described, wherein a plurality of air openings are so formed as to reduce to a minimum the danger of molten slag blocking the outlets thereof.

Other objects and applications of my invention, whereby the same may be practiced, will be apparent more fully hereinafter, when taken in connection with the accompanying drawings wherein Fig. 1 is a longitudinal, sectional view of a furnace embodying my invention;

Figs. 2 and 3 are top plan and side elevational views, respectively, of one of the tuyères shown in Fig. 1;

Figs. 4 and 5 are transverse, sectional views taken on the lines 4—4 and 5—5, respectively, of Fig. 2;

Fig. 6 is a perspective view of the supporting base plate of the tuyère shown in Figs. 2, 3 and 4;

Fig. 7 is a similar view of a removable carborundum nose block;

Fig. 8 is a similar view of one of the removable carborundum side blocks;

Figs. 9 and 10 are top plan and side elevational views, respectively, of an alternative embodiment of my invention;

Fig. 11 is a transverse, sectional view, taken on the line 11—11 of Fig. 9;

Figs. 12 and 13 are top plan and side elevational views, respectively, of still another form of tuyère embodying my invention;

Figure 1:
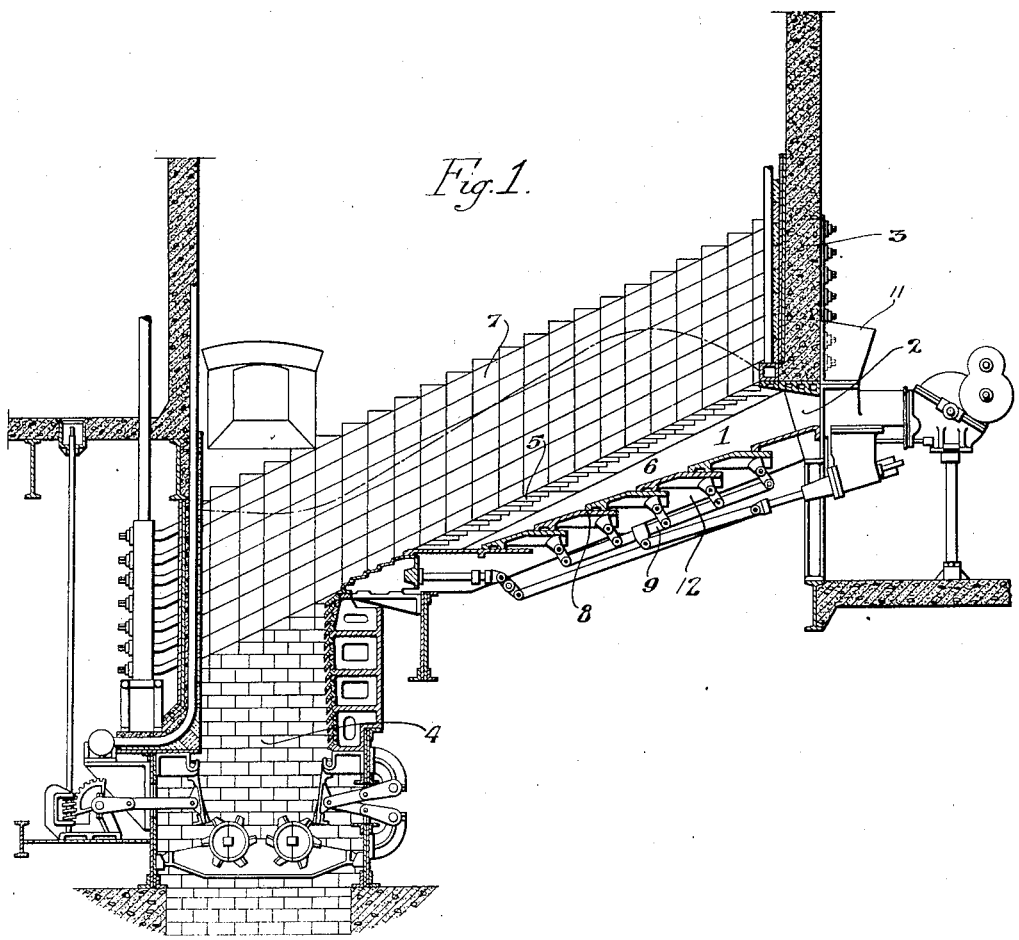

Figs. 14 and 15 are transverse, sectional views taken on the line 14—14 and 15—15, respectively, of Fig. 12;

Figs. 16 and 17 are top plan and side elevational views, respectively, of a further alternative embodiment of my invention, wherein a number of tuyères are formed en bloc;

Figs. 18 and 19 are top plan and side elevational views, respectively, of a supporting base structure for the block of tuyères shown in Figs. 16 and 17;

Figs. 20 and 21 are top plan and side elevational views, respectively, of one of the removable nose blocks shown in Fig. 16; and Figs. 22 and 23 are similar views of one of the side blocks.

When the usual tuyère is used in a stoker system employing highly preheated air, a very rapid destruction of the exposed portion of the tuyère occurs, since there is not only the heating effect of the furnace but also that of the preheated air which very frequently exceeds a temperature of 400° F.

These undesirable results are overcome in my invention by the formation of a tuyère, wherein the directly exposed surface portions are formed of a non-metallic, wear-resisting material which is capable of retaining its mechanical and structural strength under the deteriorating effect of preheated air and hot fuel. The remaining surface portions of the tuyère, which are not directly exposed, are formed of a ferrous material. The exposed tuyère surface may be formed of an inert ceramic material, such as porcelain, or of an artificial compound of carbon and silicon having the trade name of carborundum. In practice, the carborundum surface is provided by the use of carborundum protective blocks, while the ferrous surface portion may be provided by a cast-iron plate, all as will presently appear in greater detail.

In order to better illustrate my invention, a furnace employing highly preheated air is shown in Fig. 1, wherein an inclined multiple retort stoker 1 of the underfeed type extends rearwardly from a furnace opening 2 in a front wall 3 to an ash pocket 4. The stoker 1 may comprise a plurality of series of inclined tuyères 5 and a corresponding plurality of series of retorts 6 alternating therewith, only one series of each, however, being shown. A sufficient number of series of tuyères 5 and retorts 6 is provided to extend across the width of the furnace between side walls 7. A fuel bed may be built up on the grate surface provided by the inclined stoker 1 and slowly moved toward the ash pocket 4 by means of a series of pushers 8 which are actuated by mechanism 9. The retorts 6 in which the pushers are positioned may receive fuel from an outside hopper 11.

The series of tuyères 5 receive highly preheated air from a wind box 12 positioned under the same and extending across the width of the stoker. The temperature of the air, which is supplied to the series of tuyères 5 and then discharged into the furnace, may exceed a value of 400° F. The actual passage of the preheated air through the tuyères 5 is illustrated by the arrows in the detail views of one of the tuyères shown in Fig. 2. This tuyère comprises a main body portion 13 in the form of a flat, relatively thin plate composed of a ferrous material. The iron plate 13, of which Fig. 6 is a perspective view, comprises a front or outer portion 14 and a rear or inner portion 15. The front portion 14 is provided with parallel, longitudinally-extending side edges 16 and 17 which are respectively notched at 18 and 19. The inner portion 15 is provided with inclined side edges 21 and 22 which terminate in an end edge portion 23 forming a nose. The side edges 21 and 22 are provided with recessed edge portions 24 and 25 which extend to the parallel side edges 16 and 17, respectively, for reasons as will presently appear.

The tuyères further comprise a protective nose block 26 of carborundum and a pair of protective side blocks 27 and 28 also of carborundum. The side block 27, of which Fig. 8 is a perspective view, is provided with a central body portion 29 having a recess 31 adapted to receive a locking lug 32 projecting upwardly from a top side 33 of the base plate 13 just inwardly of the side edge 16. The turning of the side block 27 may be further prevented by means of a beveled portion 34 which extends into the notch 18 of the side edge 16. A rear portion 35 of the side edge 16, as well as an adjacent edge portion 36 of the recessed portion 24, are protected by means of a depending flange 37 which abuts against these edge portions. The main body portion 29 of the side block 27 is also provided with a rearwardly projecting shoulder 38 which is in spaced relation to the supporting plate 13 and which overhangs one part of the recessed edge portion 24.

The nose block 26 is similarly provided with a forwardly projecting shoulder 39 which is in spaced relation to the plate 13 and which overhangs the recessed edge portion 24. These overhanging shoulder portions 38 and 39 and the adjacent plate portions together form an air passage 41 which terminates in an outlet opening 42 in the inclined side of the pointed end of the tuyère. It is noted that the recessed edge portion 24 is positioned inwardly of the inclined side of the tuyère, with the result that the tendency for this part of the base plate to burn is decreased, and the possibility of the outlet opening 42 being blocked by molten slag passing down from the fuel bed is substantially eliminated. The opposite protective side block 28 is in all respects similar to the side block 27 just described, it being locked in position by a lug 43, and an overhanging shoulder portion 44 co-acting with a similar shoulder portion 45 of the nose block 26 to form an air passage 46. It is noted that the recessed edge portion 25 of this passage is positioned inwardly of the side of the tuyère so as to be removed as far as possible from the direct heat of the furnace and also for the purpose of increasing the dimensions of the outlet opening of the passage 46, so that danger of blocking due to molten slag may be substantially eliminated.

The nose or block 26, of which Fig. 7 is a perspective view, is mounted on the upper side 33 of the pointed end portion 15 of the base plate 13, and it covers the portion of the plate 13 which would ordinarily be directly exposed to the furnace heat. The block 26 overhangs the adjacent side and end edge portions of the base plate 13, and it is provided with a depending, marginal protective flange 47 which covers these edge portions and which extends down to an underside 48 of the base plate 13, as shown in Figs. 3, 4 and 5. Thus, the pointed end portion of the base plate 13 is completely protected by the block 26 from the heat of the furnace. The upper sides or surfaces 49 and 51 of the side blocks 27 and 28 and an upper side 52 of the end or nose block 26 are positioned in a common plane and serve to support the base plate 13 of the next higher tuyère, as shown in dot-and-dash lines in Fig. 3. The open upper side of the base plate 13 is covered by the next higher base plate, forming a main air passage therebetween which communicates with the side passages 41 and 46. The tuyère is provided with still another air passage 53 which is formed by a recess in the nose block 26, as shown in Fig. 5.

The nose block 26 is normally prevented from moving vertically relative to the base plate 13 by means of a pair of elongated upstanding lugs 54 and 55 having overhanging shoulder portions 56 and 57. These lugs are positioned on opposite sides of the central longitudinal air passage 53 and fit complementary longitudinal recesses 58 and 59 in the nose block 26. The recesses 58 and 59 terminate in a front edge portion 61, permitting the removal of the locking shoulders 56 and 57 from the recesses 58 and 59 merely by a rearward movement of the nose block 26. Such rearward movement is normally prevented by a pair of keys 62 and 63 which are positioned in transversely-extending recesses 64 and 65 in the protective block 26.

In operation, when the fuel moves over the series of tuyères 5, contact is made with wear-resisting surface portions provided by the protective blocks 26, 27 and 28 of each tuyère. Since the material forming these surface portions is also substantially unaffected by high temperatures, the tuyère is prevented from being burnt or otherwise damaged by the combined heat of the fuel and preheated air. Should it be desirable for any reason to remove the protective blocks, this may be readily done by reason of their detachable interlocking connection with the base plate 13. It is also noted that the outlet openings of the side passages 41 and 46 are so formed as to remain open even though an unusually large amount of molten slag should flow over the tuyère.

Figs. 9 to 11 illustrate a four-part tuyère which is distinguishable over that disclosed in Figs. 2 to 8, inclusive, by the fact that side blocks 66 and 67 and end block 68 are secured in position by tap bolts 69, there being one bolt for each of the side blocks and two for the end block. Each of the tap bolts 69 extends through the protective block into a threaded boss 71 which projects upwardly from an upper side 72 of a supporting base plate 73. The base plate 73 is preferably of ferrous material, while the side and end blocks 66, 67 and 68 are at least surfaced with a carborundum material. For purposes of illustration, these blocks have been shown as composed entirely of carborundum.

Figs. 12 to 15 illustrate a further embodiment of my invention, distinguishing from the previous forms of tuyères principally in the fastening means. The tuyère comprises a base plate 74 of cast-iron, a pair of carborundum side blocks 75 and 76 and a carborundum end or nose block 77. Each of the side blocks is provided with a longitudinal recess 78, terminating in a beveled end portion 79. The recess 78 is provided with inwardly-extending shoulders 81 and 82 which fit under a longitudinal head portion 83 of a locking lug 84 extending upwardly from the top side of the base plate 74. The head portion 83 co-acts with the shoulder portions 81 and 82 so as to prevent a relative vertical movement, while permitting a longitudinal rearward movement of the side block in the event that it is desired to move the same. Side edge portions 85 and 86 of the base plate 74 immediately adjacent to an inner end 87 are provided with upwardly-extending lugs 88 and 89. These lugs are formed with overhanging shoulder portions 91 and 92 which co-act with similar shoulder portions 93 and 94 of the nose block 77, preventing a vertical movement relative to the base plate 74, while permitting a relative longitudinal movement sufficient to disengage the co-acting shoulder portions. Such longitudinal movement is normally prevented by means of a bolt 95 which passes through a front portion of the nose block 77 and the base plate 74.

Figs. 16 to 23 illustrate a still further embodiment of my invention, wherein the tuyère base portions are formed en bloc. As shown particularly in Fig. 18, a plurality of base plates 96, 97, 98 and 99 are mounted in overlapping, spaced relation on a pair of side plates 101 and 102 preferably cast integral therewith. Each base plate is provided with a boss 103 on the upper side of the nose portion which fits a complementary recess 104 formed in an underside portion of a protective nose block 105. A bolt 106 extends through the block 105 and the boss 103, securing the former in position. A spacing rib 108 extends between adjacent base plates, there being one rib for each pair of plates. Each base plate is also provided with a pair of protective side blocks 109, the undersides of which are provided with recesses 111 adapted to receive side bosses 112. Each of the side blocks is further secured in position by means of a bolt 113. The side and end blocks form side outlet passages 114, as in the case of the tuyère shown in Fig. 2. The circulation of air through the nose block 105, however, is obtained by providing a recess 115 in the end of the nose piece 105 directly over a recess 116 in the pointed end of the supporting plate. Air is then supplied to the recess 116 from a passage formed by the plate just-mentioned and the next lower supporting plate, the direction of the air currents being as shown by the arrows in Fig. 17.

While I have shown several forms of embodiment of my invention, it is apparent that various additional changes may be made therein, without departing from the spirit of my invention.

I claim:

1. A tuyère comprising a base plate provided with converging side edges forming a nose portion, a protective block detachably mounted on said nose portion and extending along said side edges, and a pair of protective side blocks positioned adjacent to said first-mentioned protective block, adjacent portions of said blocks being recessed to form air passages.

2. A tuyère comprising a base plate having at one end converging side edges defining a nose, a pair of side blocks removably mounted on said base plate and having projecting portions extending along and overhanging said side edges, and a nose block mounted on said base plate and provided with overhanging projecting portions spaced from and forming with said first-mentioned overhanging portions a plurality of air passages extending to said side edges from the space embraced by said blocks, portions of said side edges in proximity to said overhanging portions being recessed inwardly, said nose block being provided with a protective flange for certain portions of said side edges.

3. A tuyère comprising a base plate having at one end converging side edges defining a nose, a pair of side blocks removably mounted on said base plate and having projecting portions extending along and overhanging said side edges, a nose block mounted on said base plate and provided with overhanging projecting portions spaced from and forming with said first-mentioned overhanging portions a plurality of air passages, said nose block being provided with a protective flange for certain portions of said side edges, and means whereby said side and nose blocks may be removably locked in position.

4. A tuyère comprising a base plate one end of which constitutes a nose, a pair of side blocks removably mounted on said base plate and having projecting portions extending along and overhanging the side edges of the nose, a nose block mounted on said base plate and provided with overhanging projecting portions spaced from and forming with said first-mentioned overhanging portions a plurality of air passages extending from the space embraced by said blocks to said nose edges, portions of said nose edges in proximity to said overhanging portions being recessed inwardly, and a plurality of locking lugs extending from said base plate, whereby said side and nose blocks may be removably secured in position.

5. A tuyère comprising a base plate provided with a pointed end, a detachable protective block for said pointed end, additional detachable protective blocks for the sides of said plate, said end block and said plate having interlocking portions preventing a relative vertical movement therebetween, and a key for preventing a relative longitudinal movement.

6. A tuyère comprising a substantially flat base plate and a superimposed element of high refractory material detachably secured thereto and constituting the fuel-supporting portion of the tuyère, said superimposed element comprising spaced depending portions constituting a support for said element upon the base plate and providing channels between the base plate and the top of said element for passage of air to the fuel.

7. A tuyère comprising a substantially flat base plate and a superimposed element of high refractory material detachably secured thereto and constituting the fuel-supporting portion of the tuyère, said superimposed element comprising spaced depending portions constituting a support for said element upon the base plate and providing channels between the base plate and the top of said element for passage of air to the fuel, and lugs projecting upwardly from said base plate and interlocking with said superimposed element to retain the latter in predetermined position upon the base.

8. A tuyère comprising a substantially flat base plate and a superimposed element of high refractory material constituting the fuel-supporting portion of the tuyère, said superimposed element comprising spaced depending portions constituting a support for said element upon the base plate and providing channels between the base plate and the top of said element for passage of air to the fuel, and means for detachably securing said element to the base plate.

9. A tuyère comprising a substantially flat base plate, and a superimposed element of high refractory material detachably secured thereto and constituting a support for the fuel and a protection for the base plate against excessive temperatures, said superimposed element comprising depending flanges adapted to embrace a portion of the side edge of said base plate to thereby shield said edge from the deteriorating effects of excessive temperatures.

10. A tuyère comprising a substantially flat base plate, and a superimposed element of high refractory material detachably secured thereto and constituting a support for the fuel and a protection for the base plate against excessive temperatures, said superimposed element comprising depending flanges adapted to embrace a portion of the side edge of said base plate to thereby shield said edge from the deteriorating effects of excessive temperatures, and said element having in its under side a channel intersecting said flanges and forming a passage for air between the base plate and said superimposed element.

11. A furnace tuyère comprising a substantially flat base plate, a structure of relatively high refractory material superimposed upon and detachably secured to said base plate, said structure having in its under side channels providing for passage of air between the base plate and said structure, said superimposed structure having depending flanges embracing and shielding portions of the edge of said base plate between adjacent terminal ends of said passages, and portions of said base plate at the said terminal ends of said passages and intermediate said flange-projected portions being recessed inwardly to afford overhanging portions of said superimposed structure projecting beyond the effective edges of said base plate.

12. In a furnace tuyère, the combination of a substantially flat metallic base plate and a superimposed highly refractory non-metallic structure detachably secured thereto, said structure being formed in its under side with channels constituting air passages between the base and said structure and forming a protective casing embracing portions both of the upper surface of said base plate and the side edges thereof.

13. In a furnace tuyère, the combination of a substantially flat base plate, and a plurality of superimposed elements of high refractory material detachably secured thereto, said elements constituting the effective fuel-supporting portion of the tuyère and each being recessed on the under side and at an edge, and said recessed edge portions in assembly being in substantial abutment whereby the said recesses form complementary portions of channels constituting passages for air between the base plate and the tops of said elements.

14. A tuyère comprising a base member, and superimposed elements of high refractory material detachably secured thereto and constituting a support for the fuel and a protection for said base member against excessive temperatures, said superimposed elements comprising depending flanges embracing portions of the sides of said base member to thereby shield said base member from the deteriorating effects of excessive temperatures.

15. A tuyère comprising a base, and superimposed elements of high refractory material detachably secured thereto and constituting a support for the fuel and a protection for the base against excessive temperatures, said superimposed elements comprising depending flanges embracing portions of the sides of said base to thereby shield said base from the deteriorating effects of excessive temperatures, and said elements having in their under sides channels intersecting said flanges and forming passages for air between the base and said superimposed elements.

16. In a furnace tuyère, the combination of a metallic base and a superimposed highly refractory non-metallic structure detachably secured thereto, said structure being formed with channels constituting air passages between the base and said structure and forming a protective casing embracing portions both of the upper surface of said base and the sides thereof.

17. In a device of the character described, the combination with a series of substantially flat tuyères arranged in stepped relation, each tuyère of said series comprising a metallic base portion and superimposed elements of a refractory material detachably secured thereto and constituting the fuel supporting portion of said tuyère, and means provided between the refractory elements and body portion of each tuyère defining substantially horizontal passages through which air is emitted to the furnace in horizontal streams.

18. In a device of the character described, the combination with a series of tuyères arranged in stepped relation, each tuyère comprising a body portion of metal and superimposed elements of a refractory material detachably secured thereto, the body portion of each tuyère having a nose portion which in assembly is adapted to rest upon the refractory elements of the next lower tuyère of the series, and means provided between the refractory elements and the body portion of each tuyère defining channels through which draft air may pass to the fuel bed.

HERBERT E. PRESTON.